US012601619B2

(12) United States Patent
Cao et al.

(10) Patent No.: US 12,601,619 B2
(45) Date of Patent: Apr. 14, 2026

(54) PHOTOELECTRIC FLOWMETER CIRCUIT AND A PHOTOELECTRIC FLOWMETER

(71) Applicant: Shanghai Kohler Electronics, Ltd., Shanghai (CN)

(72) Inventors: Bin Cao, Shanghai (CN); Jianlin Tang, Shanghai (CN)

(73) Assignee: Shanghai Kohler Electronics, Ltd., Shanghai (CN)

( * ) Notice: Subject to any disclaimer, the term of this patent is extended or adjusted under 35 U.S.C. 154(b) by 196 days.

(21) Appl. No.: 18/488,468

(22) Filed: Oct. 17, 2023

(65) Prior Publication Data

US 2024/0133723 A1    Apr. 25, 2024
US 2024/0230384 A9    Jul. 11, 2024

(30) Foreign Application Priority Data

Oct. 24, 2022    (CN) .......................... 202211300919.3
Oct. 24, 2022    (CN) ......................... 202222804360.X

(51) Int. Cl.
*G01F 1/06*        (2006.01)
*G01F 15/14*       (2006.01)
(52) U.S. Cl.
CPC .............. *G01F 1/065* (2013.01); *G01F 15/14* (2013.01)
(58) Field of Classification Search
CPC ................................. G01F 1/065; G01F 15/14
USPC ....................................................... 73/861.87
See application file for complete search history.

(56) References Cited

U.S. PATENT DOCUMENTS

| | | | |
|---|---|---|---|
| 5,218,346 A | * | 6/1993 | Meixler .................. G01F 1/065 |
| | | | 340/606 |
| 6,263,684 B1 | * | 7/2001 | Plante ..................... F25B 45/00 |
| | | | 62/149 |
| 2009/0013800 A1 | * | 1/2009 | Mehendale .......... G01F 1/8427 |
| | | | 73/861.356 |

FOREIGN PATENT DOCUMENTS

| | | | | |
|---|---|---|---|---|
| CN | 108351237 A | * | 7/2018 | .............. G01P 13/00 |
| WO | WO-2022065429 A1 | * | 3/2022 | ................ G01P 5/26 |

OTHER PUBLICATIONS

Translation of CN-108351237-A (Year: 2018).*
Translation of WO-2022065429-A1 (Year: 2022).*

* cited by examiner

*Primary Examiner* — Nathaniel T Woodward
(74) *Attorney, Agent, or Firm* — Lempia Summerfield Katz, LLC

(57) ABSTRACT

A photoelectric flowmeter circuit includes a circuit power supply end. The photoelectric flowmeter circuit also includes a light-emitting element, including a first end electrically connected to the circuit power supply end and a second end electrically connected to ground. The photoelectric flowmeter circuit also includes a photosensitive triode, including a collector electrically connected to the circuit power supply end and an emitter electrically connected to the ground. The photoelectric flowmeter circuit also includes a direct current (DC) blocking circuit. The photoelectric flowmeter circuit also includes a circuit output end electrically connected to the collector of the photosensitive triode through the DC blocking circuit.

19 Claims, 7 Drawing Sheets

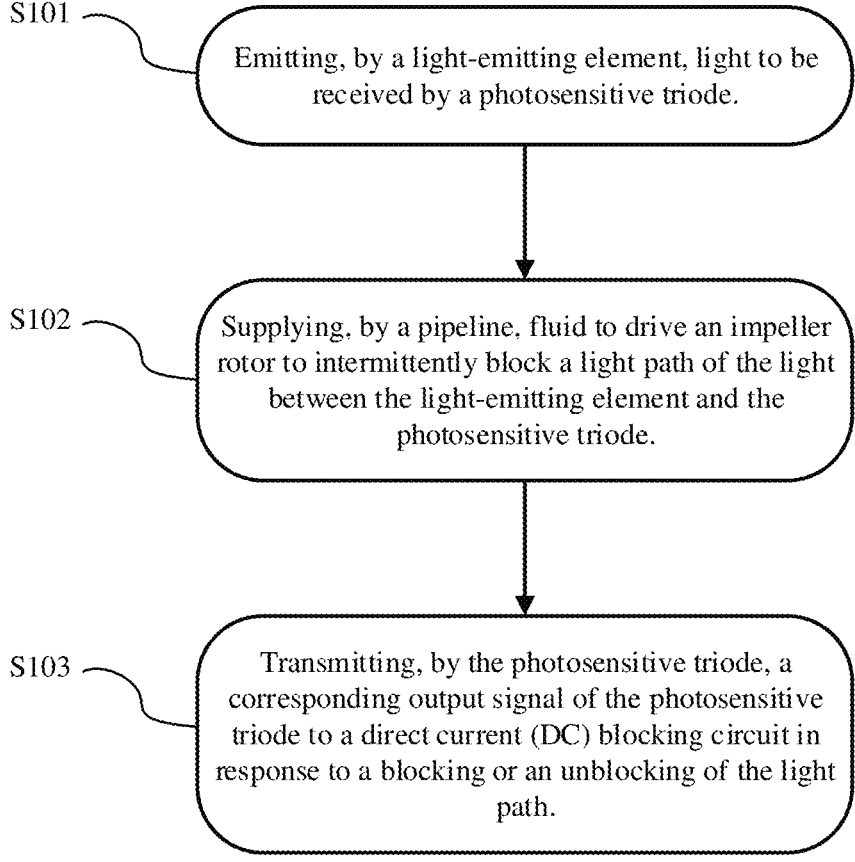

S101

Emitting, by a light-emitting element, light to be received by a photosensitive triode.

S102

Supplying, by a pipeline, fluid to drive an impeller rotor to intermittently block a light path of the light between the light-emitting element and the photosensitive triode.

S103

Transmitting, by the photosensitive triode, a corresponding output signal of the photosensitive triode to a direct current (DC) blocking circuit in response to a blocking or an unblocking of the light path.

FIG. 13

PHOTOELECTRIC FLOWMETER CIRCUIT AND A PHOTOELECTRIC FLOWMETER

CROSS REFERENCE TO RELATED APPLICATION

This application claims the benefit of priority to: Chinese Patent Application No. 202211300919.3 filed in the Chinese Intellectual Property Office on Oct. 24, 2022, which is hereby incorporated by reference in its entirety; and Chinese Patent Application No. 202222804360.X filed in the Chinese Intellectual Property Office on Oct. 24, 2022, which is hereby incorporated by reference in its entirety.

FIELD

The present disclosure relates to the technical field of measuring devices, and more particularly, to a photoelectric flowmeter circuit and a photoelectric flowmeter.

BACKGROUND

An existing photoelectric flowmeter emits light by a light-emitting diode and receives light by a photosensitive triode. An impeller is provided between the light-emitting diode and the photosensitive triode. The impeller is pushed by the liquid to intermittently block the light path between the light-emitting diode and the photosensitive triode, so that the photosensitive triode outputs a corresponding signal. The circuit schematic diagram is shown in FIG. 1 and FIG. 2.

In an existing photoelectric flowmeter circuit as shown in FIG. 1, a circuit power supply end 1' is electrically connected to a light-emitting diode D1' and a collector of a photosensitive triode Q1' through a resistor R1' and resistor R2' respectively. The other end of the light-emitting diode D1' and an emitter of the photosensitive triode Q1' are connected to a ground VSS. The resistor R2' acts as a pull-up resistor. An output signal is directly leaded out from the collector of the photosensitive triode Q1' through a connector lug 2'. The output signal is collected by a Micro Controller Unit (MCU).

In another existing photoelectric flowmeter circuit as shown in FIG. 2, a circuit power supply end 1' is electrically connected to a light-emitting diode D1' and a collector of a photosensitive triode Q1' through a resistor R1' and resistor R2' respectively. The other end of the light-emitting diode DP and an emitter of the photosensitive triode Q1' are connected to a ground VSS. The resistor R2' acts as a pull-up resistor. The collector of the photosensitive triode Q1' is connected to a base of a triode Q2' after the voltage is divided by a resistor R3' and a resistor R4'. The circuit power supply end 1' is connected to a collector of the triode Q2' through resistor R5'. The collector of the triode Q2' leads out or transmits an output signal through a connector lug 2'. The output signal is collected by the Micro Controller Unit (MCU).

However, due to water quality problems or gradual decrease of the light-emitting intensity caused by long-term work of the photoemission cell, in the photoelectric flowmeter, when the light-transmitting part of the flowmeter housing is adhered by scale and the light-emitting intensity decreases gradually due to long-term work of the photoemission cell, the signal trough is increased and thus become invalid.

The output waveform when the housing has no scale is shown FIG. 3. The output is a pulse signal of transistor-transistor logic (TTL) waveform. The high voltage level is 2~5V, and the low voltage level is 0~0.8V. In the existing micro control unit, the input end adopts Schmitt trigger. The rules for determining the TTL voltage level are: a voltage level less than 0.8V is determined as a low voltage level, and a voltage level greater than 2V is determined as a high voltage level. However, the Schmitt trigger method includes: when the voltage level is higher than 2V (trigger high threshold or high voltage level threshold), the voltage level is determined as the high voltage level. When the voltage level is lower than 0.8V, the low voltage level threshold is triggered, and the voltage level is determined as a low voltage level. Unless the voltage level is determined as the low voltage level, the voltage level remains the high voltage level. Therefore, for the Schmitt trigger method, 0.8~5V is determined as the high voltage level. Conversely, when the voltage level is at a low voltage level and the voltage increases to greater than 2V, the high voltage level threshold is triggered, and the voltage level will become the high voltage level. In other words, 0~2V is a low voltage level. Therefore, when the initial position of a shading rotor happens to make the input voltage become 0.5V (the low voltage level), the fluid (e.g., water or other liquid) flow is injected. The shading rotor continues to rotate. When the light is completely blocked out, a receiving cell is cut-off. Due to the pull-up resistor, the output is 5V (the high voltage level), the rotor continues to rotate, the light received by the receiving cell gradually become stronger, and thus gradually conductive. However, due to the scale that makes the lowest point of the trough greater than 0.8V, the Schmidt low threshold cannot be triggered, and the output voltage detected by the micro control unit remains the high voltage level.

Therefore, when the micro control unit detects an output voltage of 1.2V or more, it is determined to be a high voltage level. However, FIG. 4 shows the output waveform when housing has scale. The scale adhesion will lead to generate a direct current (DC) bias voltage. When the DC bias voltage is greater than 1.2 V, the trough of the output waveform will be greater than 1.2 V. At this time, the micro control unit will incorrectly regard a low voltage level as a high voltage level, and thus the micro control unit is ineffective.

SUMMARY

Based on the above defects, it is necessary to provide a photoelectric flowmeter circuit and a photoelectric flowmeter. The photoelectric flowmeter circuit and a photoelectric flowmeter may address the technical problem that the signal trough is increased and thus become invalid, caused by gradual decrease of the light-emitting intensity, due to the scale adhesion of the light-transmitting part of the flowmeter housing and the long-term work of the photoemission cell.

The present disclosure provides a photoelectric flowmeter circuit comprises: a light-emitting element, a photosensitive triode, and a direct current (DC) blocking circuit. A circuit power supply end is electrically connected to one end of the light-emitting element and a collector of the photosensitive triode respectively. The other end of the light-emitting element and an emitter of the photosensitive triode are grounded (e.g., electrically connected to ground), and the collector of the photosensitive triode is electrically connected to a circuit output end through the DC blocking circuit.

In an embodiment, the DC blocking circuit comprises a high pass filter circuit. One end of the high pass filter circuit is electrically connected to the collector of the photosensitive triode, and the other end of the high pass filter circuit is electrically connected to the circuit output end.

In another embodiment, the high pass filter circuit comprises a filter capacitor and a filter resistor. One end of the filter capacitor is electrically connected to the collector of the photosensitive triode, and the other end is grounded through the filter resistor. A connection point between the filter capacitor and the filter resistor is electrically connected to the circuit output end.

In another embodiment, the DC blocking circuit further comprises a clamp diode. One end of the clamp diode is electrically connected to the circuit output end and the other end being grounded.

In another embodiment, the photoelectric flowmeter circuit further comprises an amplification circuit. The DC blocking circuit is electrically connected to the circuit output end through the amplification circuit.

In another embodiment, the amplification circuit comprises a signal output triode. One end of the DC blocking circuit is electrically connected to the collector of the photosensitive triode, and the other end of the DC blocking circuit is electrically connected to a base of the signal output triode. A collector of the signal output triode is electrically connected to the circuit output end.

In another embodiment, the amplification circuit further comprises a first resistor and a second resistor. The circuit power supply end is electrically connected to the collector of the signal output triode through the first resistor. The other end of the DC blocking circuit is electrically connected to the base of the signal output triode through the second resistor.

In another embodiment, the circuit power supply end is electrically connected to the collector of the photosensitive triode through a third resistor, and the circuit power supply end is electrically connected to the light-emitting element through a fourth resistor.

In another embodiment, the light-emitting element is a light-emitting diode.

The present disclosure also provides a photoelectric flowmeter. The photoelectric flowmeter comprises a flowmeter housing and a photoelectric flowmeter circuit as described above. The photoelectric flowmeter circuit is accommodated or disposed in the flowmeter housing.

The photoelectric flowmeter circuit and the photoelectric flowmeter according to the present disclosure may eliminate the DC bias voltage by adding the DC blocking circuit. Therefore, when the scale adheres to the flowmeter housing or the photoemission cell works for a long time resulting in the gradual weakening of the light-emitting intensity, the standard level signal can still be output. Thus, the flowmeter can withstand more serious scale attachment, and the service life of the flowmeter is enhanced.

BRIEF DESCRIPTION OF THE FIGURES

FIG. 13 is a flow chart of a method for using a photoelectric flowmeter according to an example of the present disclosure.

LIST OF REFERENCE NUMBERS

Figure 1:
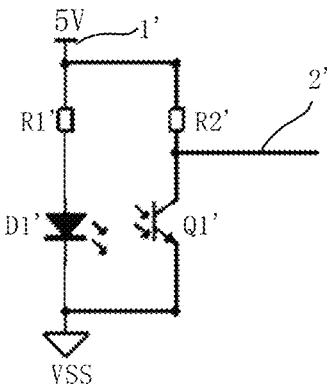
FIG. 1 is an existing photoelectric flowmeter circuit.
Figure 2:
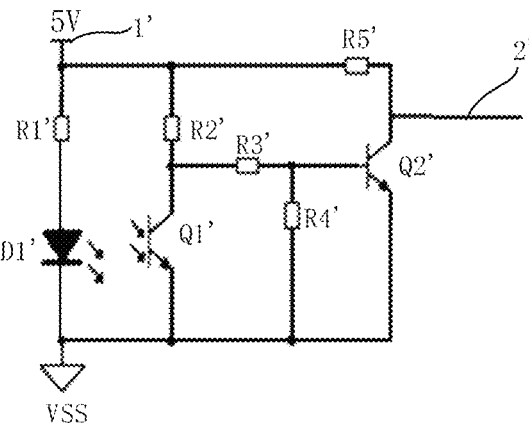
FIG. 2 is another existing photoelectric flowmeter circuit.
Figure 3:
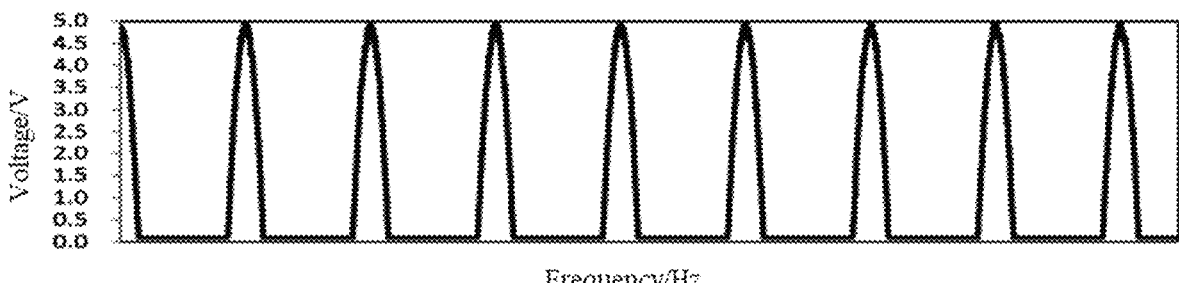
FIG. 3 is a schematic diagram of an output waveform when an existing housing has no scale.
Figure 4:
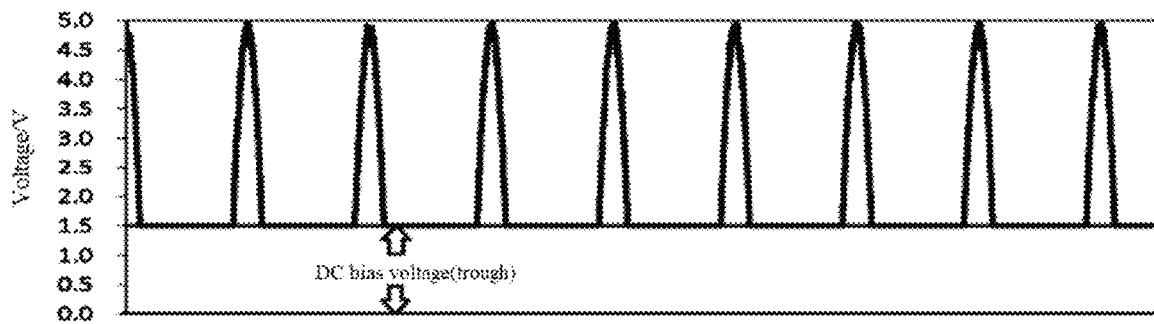
FIG. 4 is a schematic diagram of an output waveform when the existing housing has the scale.

1—light-emitting element; 11—fourth resistor; 2—photosensitive triode; 21—third resistor; 3—DC blocking circuit; 31—high pass filter circuit; 311—filter capacitor; 312—filter resistor; 32—clamp diode; 4—circuit power supply end; 5—circuit output end; 6—amplification circuit; 61—signal output triode; 62—first resistor; 63—second resistor; 7—photoelectronic flowmeter; 71—emitting head; 72—receiving head; 73—impeller rotor; 74—flowmeter housing; 75—pipeline.

DETAILED DESCRIPTION

The specific embodiments of the present disclosure are further described with reference to the drawings hereinafter. Same and equivalent parts are denoted by same reference numerals. It should be noted that the terms "front", "back", "left", "right", "up" and "down" used in the following description refer to the directions in the drawings, and the terms "inner" and "outer" refer to the directions towards or far away from geometric centers of specific parts respectively.

Figure 5:
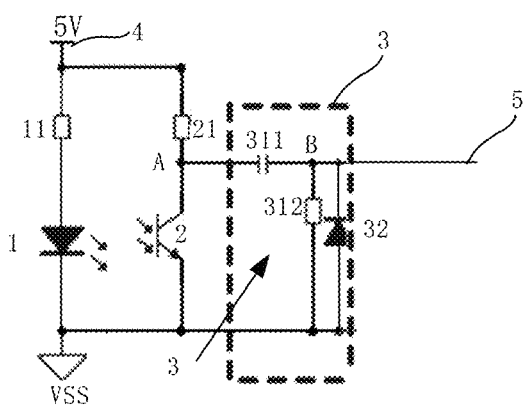
FIG. 5 is a circuit schematic diagram of a photoelectric flowmeter circuit of an embodiment of the present disclosure.

FIG. 5 shows a structural schematic diagram of a photoelectric flowmeter circuit of an example of the present disclosure. The photoelectric flowmeter circuit comprises a light-emitting element 1, a photosensitive triode 2, and a direct current (DC) blocking circuit 3. A circuit power supply end 4 is electrically connected to one end of the light-emitting element 1 and a collector of the photosensitive triode 2 respectively. The other end of the light-emitting element 1 and an emitter of the photosensitive triode 2 are grounded (e.g., electrically connected to ground). The collector of the photosensitive triode 2 is electrically connected to a circuit output end 5 through the DC blocking circuit 3.

Specifically, the circuit power supply end 4 is electrically connected to one end of the light-emitting element 1 and the collector of the photosensitive triode 2 respectively. The other end of the light-emitting element 1 and the emitter of the photosensitive triode 2 are electrically connected to the ground VSS and thus are grounded. The circuit power supply end 4 is desirably a 5V power supply. The circuit power supply end 4 supplies power to the light-emitting element 1 and causes the light-emitting element 1 to emit light. The photosensitive triode 2 receives the light and becomes conductive (e.g., switched on), and the collector of the photosensitive triode 2 outputs a signal. The output signal of the photosensitive triode 2 remains a pulse signal of transistor-transistor logic (TTL) waveform. Desirably, the high voltage level is 1.2~5 V, and the low voltage level is 0~0.8 V. The signal eliminates the DC bias voltage via the DC blocking circuit 3 and is output from a connector lug of the circuit output end 5.

The scale adhesion or gradual decrease of the light-emitting intensity due to long-term work of the photoemission cell may weaken the received light. Because the receiving cell is a photoelectric receiving cell and its conduction and cutoff are controlled by the light intensity, the signal trough is increased.

The subsequent description is illustrated by using the scale adhesion as an example. The description is also applicable to the gradual decrease of the light-emitting intensity due to the long-term work of the photoemission cell.

When there is no scale, since the water flow drives the rotor, the receiving cell will eventually have a state of completely blocking and completely transmitting light, i.e., saturated conduction (i.e., the resistance value of the "be" end of the receiving cell is extremely small) and cut-off. When there is the scale, in the state of completely transmitting light, the light intensity does not reach the light intensity that makes the receiving cell completely conducted, that is, unsaturated conduction (that is, the resistance value of the "be" end of the receiving cell becomes larger), and at this time, it is divided with the pull-up resistor, the trough of the signal is the divided voltage value at this time.

Figure 7:
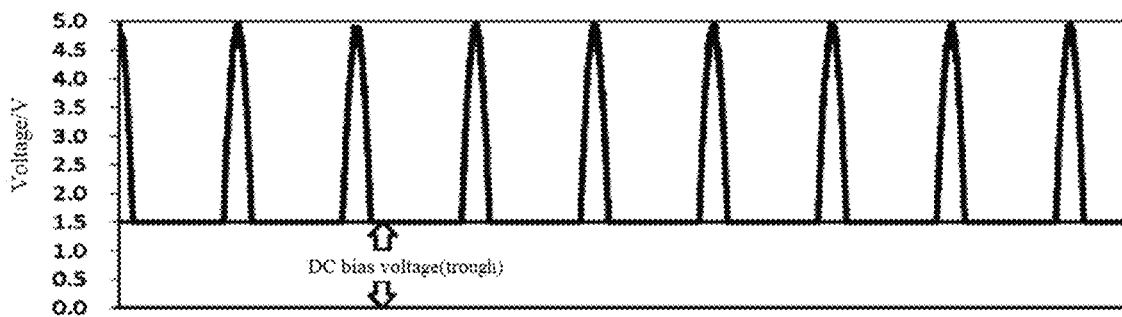
FIG. 7 is a schematic diagram of a waveform when there is the scale, before a signal passes through a DC blocking circuit, according to an example of the present disclosure.
Figure 8:
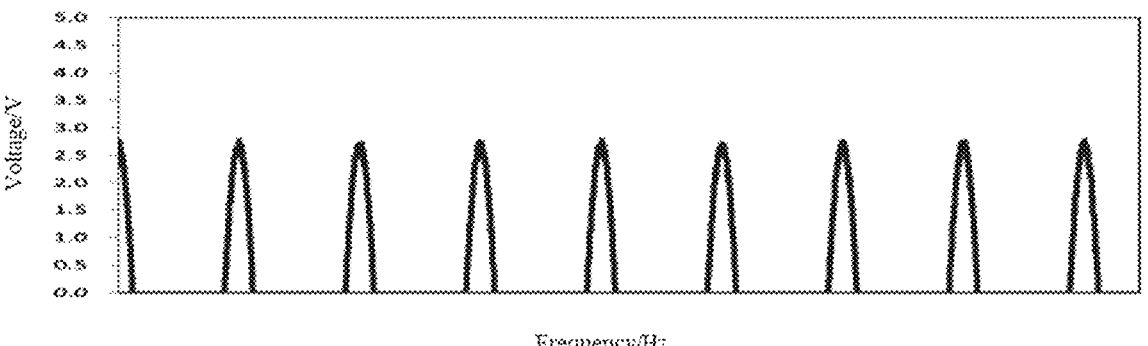
FIG. 8 is a schematic diagram of a waveform when there is scale, after a signal passes through the DC blocking circuit, according to an example of the present disclosure.

FIG. 7 shows a schematic diagram of a waveform when there is the scale before a signal passes through a DC blocking circuit, according to an example of the present disclosure. FIG. 8 is a schematic diagram of a waveform when there is scale, after a signal passes through the DC blocking circuit, according to an example of the present disclosure. As shown in FIG. 8, in this embodiment, when there is the scale, the trough of the waveform is reduced to 0V after the DC bias voltage is eliminated by the DC blocking circuit 3, so as to prevent the trough from being incorrectly determined as a high voltage level.

The present disclosure eliminates the DC bias voltage by adding the DC blocking circuit. Thus, when a flowmeter housing is adhered by the scale, a standard level signal can still be output, and the flowmeter can withstand more serious scale attachment. Thus, the service life of the flowmeter may be enhanced.

FIG. 5 shows a circuit schematic diagram of a photoelectric flowmeter circuit in another embodiment of the present disclosure. The photoelectric flowmeter circuit comprises a light-emitting element 1, a photosensitive triode 2, and a direct current (DC) blocking circuit 3. A circuit power supply end 4 is electrically connected to one end of the light-emitting element 1 through a fourth resister 11 and is electrically connected to a collector of the photosensitive triode 2 through a third resister 21. The other end of the light-emitting element 1 and an emitter of the photosensitive triode 2 are grounded. The collector of the photosensitive triode 2 is electrically connected to a circuit output end 5 through the DC blocking circuit 3. The light-emitting element 1 is a light-emitting diode.

The DC blocking circuit 3 comprises a high pass filter circuit 31 and a clamp diode 32. One end of the high pass filter circuit 31 is electrically connected to the collector of the photosensitive triode 2, and the other end of the high pass filter circuit 31 is electrically connected to the circuit output end 5. The high pass filter circuit 31 comprises a filter capacitor 311 and a filter resistor 312. One end of the filter capacitor 311 is electrically connected to the collector of the photosensitive triode 2, and the other end of the filter capacitor 311 is grounded through the filter resistor 312. A connection point between the filter capacitor 311 and the filter resistor 312 is electrically connected to the circuit output end 5. One end of the clamp diode 32 is electrically connected to the circuit output end 5 and the other end of the clamp diode 32 is grounded.

Specifically, the circuit power supply end 4 is electrically connected to one end of the light-emitting element 1 thought the fourth resistor 11 and is electrically connected to the collector of the photosensitive triode 2 through the third resistor 21. The other end of the light-emitting element 1 and an emitter of the photosensitive triode 2 are electrically connected with the ground VSS and thus are grounded. The circuit power supply end 4 is desirably a 5V power supply. The light-emitting element 1 is a light-emitting diode. The circuit power supply end 4 supplies power to the light-emitting element 1 and causes the light-emitting element 1 to emit light. The photosensitive triode 2 receives the light and becomes conductive (e.g., switched on). The circuit power supply end 4 is electrically connected to the collector of the photosensitive triode 2 through the third resistor 21 as a pull-up resistor. The collector of the photosensitive triode 2 outputs a signal. The output signal of the photosensitive triode 2 remains a TTL signal. Desirably, the high voltage level is 1.2~5 V, and the low voltage level is 0~0.8 V. The signal eliminates the DC bias voltage via the DC blocking circuit 3 and is output from a connector lug of the circuit output end 5.

The DC blocking circuit 3 includes the high pass filter circuit 31, and the high pass filter circuit 31 eliminates the DC bias voltage in the collector output signal of the photosensitive triode 2. The collector output signal of the photosensitive triode 2 passes through the high pass filter circuit 31 comprising the filter capacitor 311 and the filter resistor 312. The high pass filter circuit 31 eliminates the DC bias voltage, and then the reverse voltage is clamped through the clamp diode 32. The waveform at point A when there is the scale is shown in FIG. 7. The waveform at point B after a signal passes through the high pass filter circuit 31 is shown in FIG. 8. In this embodiment, when there is the scale, the trough of the waveform is reduced to 0V after the DC bias voltage is eliminated by the DC blocking circuit 3, so as to prevent the trough from being incorrectly determined as a high voltage level.

In this embodiment, the DC bias voltage is eliminated by the high pass filter circuit of the DC blocking circuit, and the reverse voltage is clamped by the clamp diode. Thus, when a flowmeter housing is adhered by the scale or the photoemission cell works for a long time resulting in the gradual decrease of the light-emitting intensity, the standard level signal can still be output. The circuit in this embodiment is simple and requires fewer electronic components, and the structure of the flowmeter does not need to be changed. The circuit in this embodiment can withstand more serious scale adhesion, and the service life of the flowmeter is enhanced.

Figure 6:
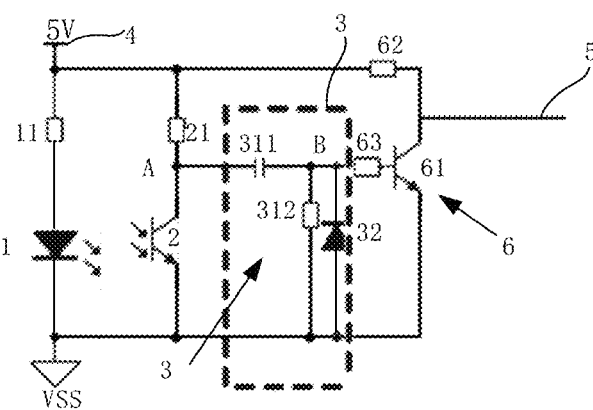
FIG. 6 is a circuit schematic diagram of a photoelectric flowmeter circuit of another example of the present disclosure.

FIG. 6 shows a photoelectric flowmeter circuit in another example of the present disclosure. The photoelectric flowmeter circuit comprises a light-emitting element 1, a photosensitive triode 2, and a DC blocking circuit 3, and an amplification circuit 6. A circuit power supply end 4 is respectively electrically connected to one end of the light-emitting element 1 through a fourth resister 11 and is electrically connected to a collector of the photosensitive triode 2 through a third resister 21. The other end of the light-emitting element 1 and an emitter of the photosensitive triode 2 are grounded. The collector of the photosensitive triode 2 is electrically connected to a circuit output end 5 successively through the DC blocking circuit 3 and the amplification circuit 6. The light-emitting element 1 is a light-emitting diode;

The DC blocking circuit 3 comprises a high pass filter circuit 31 and a clamp diode 32. One end of the high pass filter circuit 31 is electrically connected to the collector of the photosensitive triode 2, and the other end of the high pass filter circuit 31 is electrically connected to the circuit output end 5. The high pass filter circuit 31 comprises a filter capacitor 311 and a filter resistor 312. One end of the filter capacitor 311 is electrically connected to the collector of the photosensitive triode 2, and the other end of the filter capacitor 311 is grounded through the filter resistor 312. A connection point between the filter capacitor 311 and the filter resistor 312 is electrically connected to the circuit output end 5. One end of the clamp diode 32 is electrically connected to the circuit output end 5, and the other end of the clamp diode 32 is grounded.

The amplification circuit 6 comprises a signal output triode 61. One end of the DC blocking circuit 3 is electrically connected to the collector of the photosensitive triode 2, and the other end of the DC blocking circuit 3 is electrically connected to a base of the signal output triode 61 through a second resistor 63. The circuit power supply end 4 is electrically connected to a collector of the signal output triode 61 through a first resistor 62, and the collector of the signal output triode 61 is electrically connected to the circuit output end 5.

Specifically, the circuit power supply end 4 is electrically connected to one end of the light-emitting element 1 through a fourth resistor 11 and is electrically connected to the collector of the photosensitive triode 2 through a third resistor 21. The other end of the light-emitting element 1 and an emitter of the photosensitive triode 2 are electrically connected to the ground VSS and are thus grounded. The circuit power supply end 4 is desirably a 5V power supply. The light-emitting element 1 is a light-emitting diode. The circuit power supply end 4 supplies power to the light-emitting element 1 and causes the light-emitting element 1 to emit light. The photosensitive triode 2 receives the light and becomes conductive (e.g., switched on). The circuit power supply end 4 is electrically connected to the collector of the photosensitive triode 2 through the third resistor 21 as a pull-up resistor, and the collector of the photosensitive triode 2 outputs a signal. The output signal of the photosensitive triode 2 remains a pulse signal of TTL waveform. Desirably, the high voltage level is 1.2~5 V, and the low voltage level is 0~0.8 V. The signal eliminates the DC bias voltage via the DC blocking circuit 3 and is amplified by the amplification circuit 6 and output from the connector lug of the circuit output end 5.

The DC blocking circuit 3 includes a high pass filter circuit 31, and the high pass filter circuit 31 eliminates the DC bias voltage in the collector output signal of the photosensitive triode 2. The collector output signal of the photosensitive triode 2 passes through the high pass filter circuit 31 comprising a filter capacitor 311 and a filter resistor 312. The high pass filter circuit 31 eliminates the DC bias voltage, and then the reverse voltage is clamped through a clamp diode 32. FIG. 7 shows the waveform at point A when there is the scale. FIG. 8 shows the waveform at point B after a signal passes through the high pass filter circuit 31. In this embodiment, when there is the scale, the trough of the waveform is reduced to 0V after the DC bias voltage is eliminated by the DC blocking circuit 3, so as to prevent the trough from being misjudged as a high voltage level.

Figure 9:
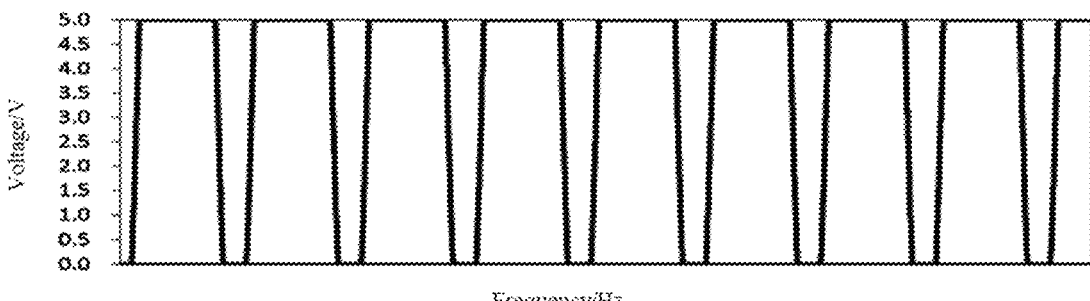
FIG. 9 is a schematic diagram of a waveform when there is the scale, after a signal passes through an amplification circuit, according to an example of the present disclosure.

FIG. 9 is a schematic diagram of a waveform when there is the scale, after a signal passes through an amplification circuit, according to an example of the present disclosure. Finally, the standard TTL voltage level is output, as shown in FIG. 9. The amplification circuit 6 comprises a signal output triode 61, and the signal output triode 61 of this embodiment only amplifies the pulse signal when scale is adhered.

In this embodiment, the DC bias voltage is eliminated by the high pass filter circuit of the DC blocking circuit, and the reverse voltage is clamped by the clamp diode. Thus, when a flowmeter housing is adhered by the scale, the standard level signal can still be output, the pulse signal is amplified by the amplification circuit, which is convenient for subsequent detection by the micro control unit. The circuit in this embodiment is simple and requires fewer electronic components, and the structure of the flowmeter does not need to be changed. The circuit in this embodiment can withstand more serious scale adhesion, and thus the service life of the flowmeter is enhanced.

Figure 10:
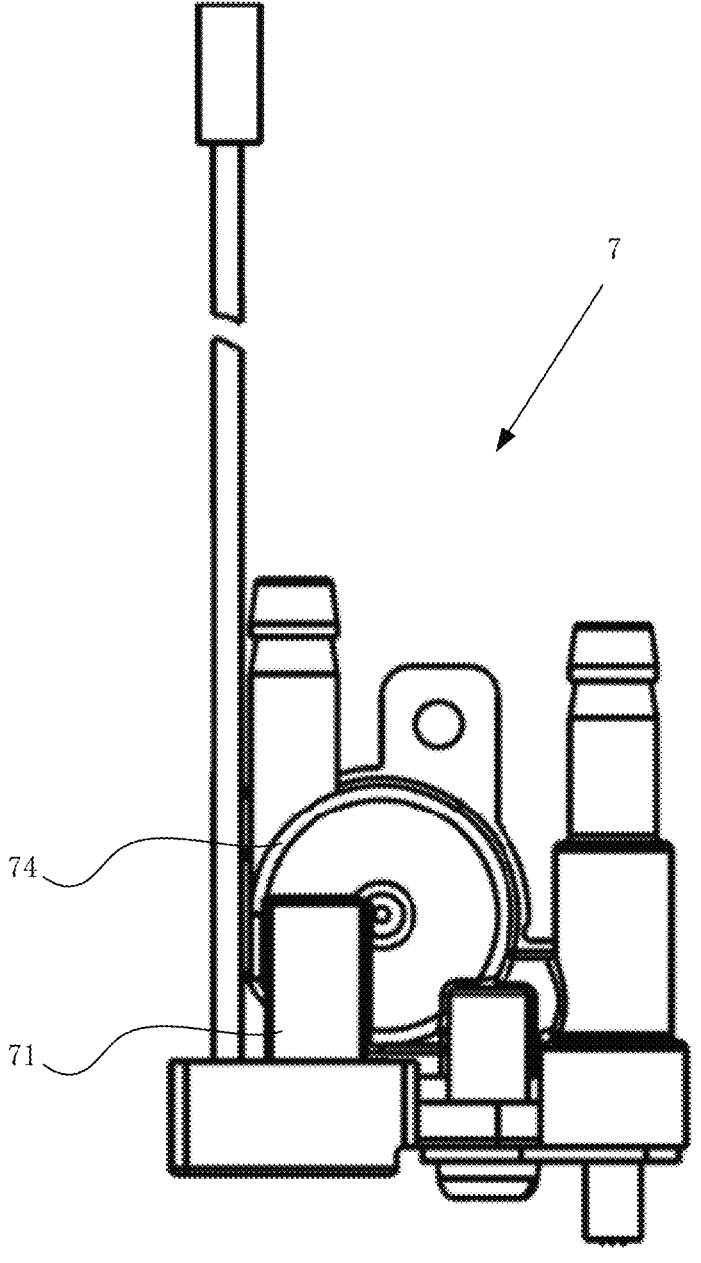
FIG. 10 is a structural schematic diagram of a photoelectric flow meter of the present disclosure.
Figure 11:
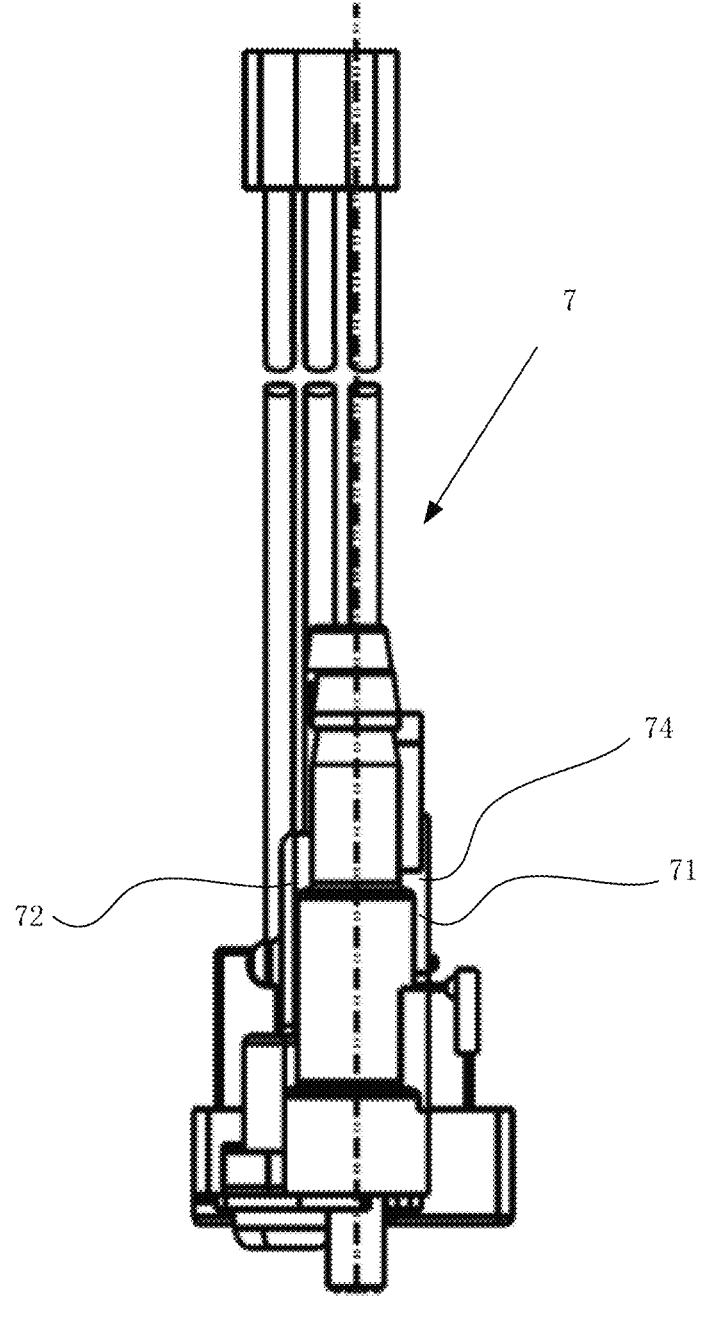
FIG. 11 is a front view diagram of a photoelectric flowmeter of the present disclosure.
Figure 12:
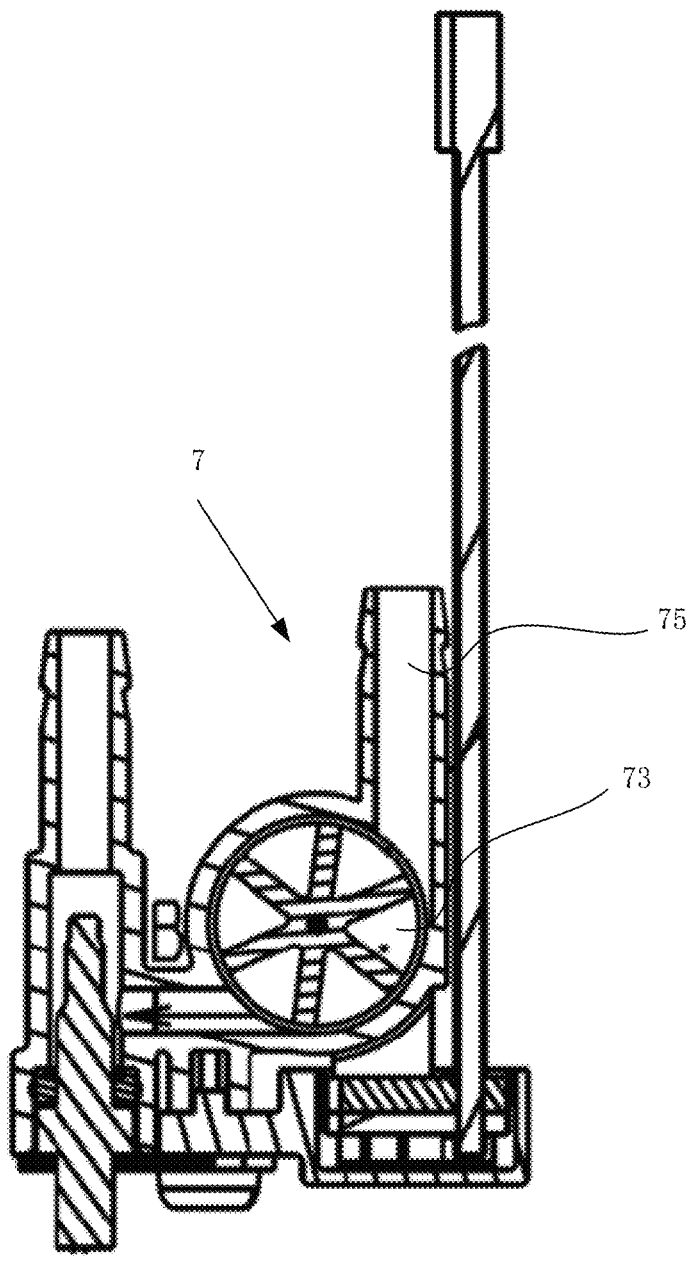
FIG. 12 is a sectional view diagram of a photoelectric flowmeter of the present disclosure.

FIG. 10 is a structural schematic diagram of a photoelectric flow meter of the present disclosure. FIG. 11 is a front view diagram of a photoelectric flowmeter of the present disclosure. FIG. 12 is a sectional view diagram of a photoelectric flowmeter of the present disclosure. As shown in FIGS. 10, 11, and 12, the embodiment in this the present disclosure provides a photoelectric flowmeter, comprising a flowmeter housing and a photoelectric flowmeter circuit as described above. The photoelectric flowmeter circuit is accommodated or disposed in the flowmeter housing.

Specifically, as shown in FIGS. 10, 11, and 12, the photoelectric flowmeter 7 comprises a flowmeter housing 74. An impeller rotor 73 and a pipeline 75 are disposed in the flowmeter housing 74. The flowmeter housing 74 is provided with an emitting head 71 and a receiving head 72. The emitting element 1 is disposed in the emitting head 71, and the photosensitive triode 2 is disposed in the receiving head 72. The light-emitting element 1 in the emitting head 71 is configured to emit infrared light, and the photosensitive triode 2 in the receiving head 72 is configured to output a low voltage level when the photosensitive triode 2 receives the light and output a high voltage level when the photosensitive triode 2 does not receive the light.

After the water flow is injected from the pipeline 75, the impeller rotor 73 is driven to rotate, and an approximate square wave signal (e.g., a substantially squire wave signal) is output from the photosensitive triode 2. In an embodiment, the impeller rotor 73 is disposed between the emitting head 71 and the receiving head 72. The impeller rotor 73 is configured to intermittently block a light path between the light-emitting element 1 and the photosensitive triode 2 so that the photosensitive triode 2 generates the approximate square wave signal.

When the scale adheres to a middle position between the emitting head 71 and the receiving head 72, the light received by the receiving head 72 becomes weaker, and the voltage trough is raised.

FIG. 13 is a flow chart of a method for using a photoelectric flowmeter according to an example of the present disclosure. The photoelectric flowmeter used in the method may be the photoelectric flowmeter according to any of the foregoing examples and may be configured to perform an operation, function, or the like as described in the present disclosure.

At act S101, the light-emitting element 1 may emit the light to be received by the photosensitive triode 2.

As noted above, the light-emitting element 1 is disposed in the emitting head 71 is configured to emit infrared light. The circuit power supply end 4 supplies power to the light-emitting element 1 and causes the light-emitting element 1 to emit the light. The photosensitive triode 2 receives the light and becomes conductive (e.g., switched on). The photosensitive triode 2 is disposed in the receiving head 72.

At act S102, the pipeline 75 may supply the fluid to drive the impeller rotor 73 to intermittently block the light path of the light between the light-emitting element 1 and the photosensitive triode 2.

As noted above, the impeller rotor 73 and the pipeline 75 are disposed in the flowmeter housing 74. After the fluid flow is injected from the pipeline 75, the impeller rotor 73 is driven to rotate, and an approximate square wave signal (e.g., a substantially squire wave signal) is output from the photosensitive triode 2. In an embodiment, the impeller rotor 73 is disposed between the emitting head 71 and the receiving head 72. The impeller rotor 73 is configured to intermittently block a light path between the light-emitting element 1 and the photosensitive triode 2 so that the photosensitive triode 2 generates the approximate square wave signal.

At act S103, the photosensitive triode may transmit a corresponding output signal of the photosensitive triode to the direct current (DC) blocking circuit 3 in response to a blocking or an unblocking of the light path.

As noted above, the photosensitive triode 2 in the receiving head 72 is configured to output the low voltage level when the photosensitive triode 2 receives the light (e.g., in response to the unblocking of the light path) and output the high voltage level when the photosensitive triode 2 does not receive the light (e.g., in response to the blocking of the light path). Desirably, the high voltage level is 1.2~5 V, and the low voltage level is 0~0.8 V. The signal eliminates the DC bias voltage via the DC blocking circuit 3 and is output from a connector lug of the circuit output end 5. The output signal of the photosensitive triode 2 remains the pulse signal of TTL waveform.

The present disclosure eliminates the DC bias voltage by adding the DC blocking circuit. Thus, when a flowmeter housing is adhered by the scale or the photoemission cell works for a long time resulting in the gradual decrease of the light-emitting intensity, the standard level signal can still be output, and thus the flowmeter can withstand more serious scale attachment, and the service life of the flowmeter is enhanced.

The above-described embodiments only express several embodiments of the present disclosure. The descriptions are relatively specific and detailed. However, the descriptions should not be understood as a limitation of the protection scope of the present disclosure. It should be pointed out that, for those having ordinary skill in the art, other modifications and improvements may be made based on the principle of the present disclosure, which should also be regarded as falling in the protection scope of the present disclosure. Therefore, the protection scope of protection of the present disclosure shall be subject to the appended claims.

We claim:

1. A photoelectric flowmeter circuit, comprising:
a circuit power supply end;
a light-emitting element, comprising:
    a first end electrically connected to the circuit power supply end; and
    a second end electrically connected to ground;

a photosensitive triode, comprising:
    a collector electrically connected to the circuit power supply end; and
    an emitter electrically connected to the ground;
a direct current (DC) blocking circuit; and
a circuit output end electrically connected to the collector of the photosensitive triode through the DC blocking circuit,
wherein the DC blocking circuit further comprises:
    a clamp diode, comprising:
        a first end electrically connected to the circuit output end; and
        a second end electrically connected to the ground.

2. The photoelectric flowmeter circuit according to claim 1, wherein the DC blocking circuit comprises:
a high pass filter circuit, comprising:
    a first end electrically connected to the collector of the photosensitive triode; and
    a second end of the high pass filter circuit electrically connected to the circuit output end.

3. The photoelectric flowmeter circuit according to claim 2, wherein the high pass filter circuit comprises:
a filter resistor; and
a filter capacitor, comprising:
    a first end electrically connected to the collector of the photosensitive triode; and
    a second end electrically connected to the ground through the filter resistor, and
wherein a connection point between the filter capacitor and the filter resistor is electrically connected to the circuit output end.

4. The photoelectric flowmeter circuit according to claim 1, further comprises an amplification circuit,
wherein the DC blocking circuit is electrically connected to the circuit output end through the amplification circuit.

5. The photoelectric flowmeter circuit according to claim 4,
wherein the amplification circuit comprises:
    a signal output triode, comprising a collector electrically connected to the circuit output end; and
    a base, and
wherein the DC blocking circuit comprises:
    a first end electrically connected to the collector of the photosensitive triode; and
    a second end electrically connected to the base of the signal output triode.

6. The photoelectric flowmeter circuit according to claim 5, wherein the amplification circuit further comprises a first resistor and a second resistor,
wherein the circuit power supply end is electrically connected to the collector of the signal output triode through the first resistor, and
wherein the second end of the DC blocking circuit is electrically connected to the base of the signal output triode through the second resistor.

7. The photoelectric flowmeter circuit according to claim 1, further comprising a third resistor and a fourth resistor,
wherein the circuit power supply end is electrically connected to the collector of the photosensitive triode through the third resistor, and
wherein the circuit power supply end is electrically connected to the light-emitting element through the fourth resistor.

8. The photoelectric flowmeter circuit according to claim 1, wherein the light-emitting element is a light-emitting diode.

9. A photoelectric flowmeter, comprising:

a flowmeter housing, comprising:

an emitting head configured to emit light; and a receiving head configured to receive the light; and a photoelectric flowmeter circuit disposed in the flowmeter housing, the photoelectric flowmeter circuit comprising:

a circuit power supply end;

a light-emitting element disposed in the emitting head, the light-emitting element comprising:

a first end electrically connected to the circuit power supply end; and a second end electrically connected to ground;

a photosensitive triode disposed in the receiving head, the photosensitive triode comprising:

a collector electrically connected to the circuit power supply end; and an emitter electrically connected to the ground;

a direct current (DC) blocking circuit; and a circuit output end electrically connected to the collector of the photosensitive triode through the DC blocking circuit, wherein the DC blocking circuit further comprises:

a clamp diode, comprising:

a first end electrically connected to the circuit output end; and a second end electrically connected to the ground.

10. The photoelectric flowmeter according to claim 9, wherein the flowmeter housing further comprises:

a pipeline configured to inject liquid; and an impeller rotor disposed between the emitting head and the receiving head and configured to be driven by the liquid.

11. The photoelectric flowmeter according to claim 10, wherein the impeller rotor is configured to be driven by the liquid to intermittently block a light path between the light-emitting element and the photosensitive triode so that the photosensitive triode generates a substantially square wave signal.

12. The photoelectric flowmeter according to claim 9, wherein when the photosensitive triode receives the light from the light-emitting element, the photosensitive triode outputs a low voltage level, and wherein when the photosensitive triode does not receive the light from the light-emitting element, the photosensitive triode outputs a high voltage level.

13. The photoelectric flowmeter according to claim 9, wherein the DC blocking circuit comprises:

a high pass filter circuit, comprising:

a first end electrically connected to the collector of the photosensitive triode; and a second end of the high pass filter circuit electrically connected to the circuit output end.

14. The photoelectric flowmeter according to claim 13, wherein the high pass filter circuit comprises:

a filter resistor; and a filter capacitor, comprising:

a first end electrically connected to the collector of the photosensitive triode; and a second end electrically connected to the ground through the filter resistor, and wherein a connection point between the filter capacitor and the filter resistor is electrically connected to the circuit output end.

15. The photoelectric flowmeter according to claim 9, further comprises an amplification circuit, wherein the DC blocking circuit is electrically connected to the circuit output end through the amplification circuit.

16. The photoelectric flowmeter according to claim 15, wherein the amplification circuit comprises:

a signal output triode, comprising a collector electrically connected to the circuit output end; and a base, and wherein the DC blocking circuit comprises:

a first end electrically connected to the collector of the photosensitive triode; and a second end electrically connected to the base of the signal output triode.

17. A method for using a photoelectric flowmeter, the method comprising:

emitting, by a light-emitting element, light to be received by a photosensitive triode;

supplying, by a pipeline, fluid to drive an impeller rotor to intermittently block a light path of the light between the light-emitting element and the photosensitive triode;

transmitting, by the photosensitive triode, a corresponding output signal of the photosensitive triode to a direct current (DC) blocking circuit in response to a blocking or an unblocking of the light path; and clamping, by a clamp diode of the DC blocking circuit, a reverse voltage, wherein the clamp diode comprises a first end electrically connected to a circuit output end and comprises a second end electrically connected to ground.

18. The method according to claim 17, further comprising:

transmitting, by the DC blocking circuit, an output signal of the DC blocking circuit to the circuit output end through an amplification circuit.

19. The method according to claim 17, further comprising:

eliminating, by a high pass filter circuit of the DC blocking circuit, a DC bias voltage in the corresponding output signal.

\* \* \* \* \*